United States Patent
Anagnostos et al.

(10) Patent No.: US 10,956,993 B2
(45) Date of Patent: Mar. 23, 2021

(54) METHOD AND DEVICE FOR DETERMINING ENERGY SYSTEM OPERATING SCENARIO

(71) Applicants: IMEC VZW, Leuven (BE); Katholieke Universiteit Leuven, KU LEUVEN R&D, Leuven (BE)

(72) Inventors: Dimitrios Anagnostos, Brussels (BE); Francky Catthoor, Temse (BE); Johannes Goverde, Grimbergen (BE)

(73) Assignees: IMEC VZW, Leuven (BE); KATHOLIEKE UNIVERSITEIT LEUVEN, KU LEUVEN R&D, Leuven (BE)

( * ) Notice: Subject to any disclaimer, the term of this patent is extended or adjusted under 35 U.S.C. 154(b) by 34 days.

(21) Appl. No.: 16/426,410

(22) Filed: May 30, 2019

(65) Prior Publication Data
US 2019/0370914 A1    Dec. 5, 2019

(30) Foreign Application Priority Data
May 31, 2018 (EP) .................... 18175427

(51) Int. Cl.
*G06Q 50/06* (2012.01)
*G05B 15/02* (2006.01)

(52) U.S. Cl.
CPC ............. *G06Q 50/06* (2013.01); *G05B 15/02* (2013.01)

(58) Field of Classification Search
CPC ........ G06Q 50/06; G06Q 10/04; G05B 15/02; H02J 3/00
See application file for complete search history.

(56) References Cited

U.S. PATENT DOCUMENTS

| | | | |
|---|---|---|---|
| 10,726,341 B2* | 7/2020 | Ignatova | G06N 5/04 |
| 10,732,319 B2* | 8/2020 | Feng | G06N 3/08 |
| 2015/0012258 A1* | 1/2015 | Caine | G06F 30/20 |
| | | | 703/18 |
| 2015/0261846 A1* | 9/2015 | Hall | G06F 17/18 |
| | | | 707/738 |

(Continued)

FOREIGN PATENT DOCUMENTS

| | | |
|---|---|---|
| EP | 2998756 A1 | 3/2016 |
| WO | WO2017/035629 A1 | 3/2017 |
| WO | WO 2017/214210 A1 | 12/2017 |

OTHER PUBLICATIONS

European Search Report, European Patent Application No. EP 18175427.6, dated Sep. 13, 2018, 9 pages.

*Primary Examiner* — Ramesh B Patel
(74) *Attorney, Agent, or Firm* — McDonnell Boehnen Hulbert & Berghoff LLP

(57) ABSTRACT

A computer-implemented method and related device are disclosed for determining a plurality of operating scenarios of an energy system. The method comprises obtaining a plurality of performance measures of the energy system as a function of time corresponding to a plurality of sets of values of input variables. The method comprises clustering the plurality of sets of values of the input variables and the performance measures associated therewith into groups and defining a descriptor for each of the groups. The method also comprises outputting the descriptors of the groups for use in an online prediction or offline estimation of the energy system.

20 Claims, 4 Drawing Sheets

(56) References Cited

U.S. PATENT DOCUMENTS

| | | | |
|---|---|---|---|
| 2015/0316907 A1* | 11/2015 | Elbsat | G05B 15/02 |
| | | | 700/275 |
| 2016/0004805 A1* | 1/2016 | Drees | G06Q 50/08 |
| | | | 703/2 |
| 2016/0281607 A1* | 9/2016 | Asati | F02C 6/18 |
| 2018/0046151 A1* | 2/2018 | Ahmed | G05B 13/026 |
| 2018/0046926 A1* | 2/2018 | Achin | G06N 5/02 |
| 2018/0275314 A1* | 9/2018 | Pavlovski | H02J 3/383 |
| 2018/0300650 A1* | 10/2018 | Gebremariam | G06F 16/258 |

* cited by examiner

METHOD AND DEVICE FOR DETERMINING ENERGY SYSTEM OPERATING SCENARIO

CROSS-REFERENCE TO RELATED APPLICATIONS

The present application is a non-provisional patent application claiming priority to European Patent Application No. 18175427.6, filed May 31, 2018, the contents of which are hereby incorporated by reference.

FIELD OF THE DISCLOSURE

The disclosure relates to the field of electrical energy systems, such as electrical grids, energy producers, and/or energy consumers. More specifically it relates to a device and method for determining a plurality of operating scenarios of an energy system, such as an electrical grid, an energy consumer or plurality of energy consumers, an energy producer or plurality of energy producers, or a combination thereof. The electrical energy systems referred to in the present disclosure may particularly relate to energy systems that are dependent on stochastic dynamic variables, e.g. having a yield and/or load that depends on ambient parameters.

BACKGROUND

Energy sources, such as distributed renewable energy sources, can pose technical challenges in the integration thereof, in the prediction of energy yields and in the balancing of an intermittent energy production with energy consumption demands. For example, it may be challenging to accurately predict a net energy production or consumption as this may depend on stochastic factors that may be difficult to predict, e.g. on local weather conditions such as clouds, the ambient temperature, the wind direction, and/or the wind strength.

Such challenges may extend over various temporal and spatial scales. For example, a consumer, e.g. a prosumer, may want to balance a local production, such as an energy production from solar energy, with a local energy consumption in order to reduce energy costs, for example by using a lower capacity tariff, and/or to improve self-sustainability, e.g. to improve the independence of non-local energy sources.

Distribution system operators (DSO) may want to locally balance a production and a consumption, e.g. on the level of a feeder and a transformer, to facilitate the management of a grid and/or to achieve a reduction or deferment of investments in grid upgrades. Such balancing may be particularly desirable in view of an increasing share of variable energy sources, e.g. of renewable energy sources.

Balancing responsible parties (BRP) may need to balance the consumption of their customers with their own production portfolio, e.g. which may comprise intermittent and/or difficult to predict energy sources.

For example, the total photovoltaic energy harvesting capacity world-wide can be estimated to be over 300 GWp, with 100 GWp in Europe, and a rapid growth can be expected as countries transition to cleaner electricity sources. In the current electricity market, TSOs have the responsibility of balancing, and currently they apply a penalty for aggregators if they make errors in their projection up to 540€/MW which is a fluctuating price. Better yield prediction models may benefit all the involved players financially on the long-term, e.g. prosumers/operators, DSOs and TSOs.

Therefore, a need exists for good short-time forecasting models and methods to achieve a good matching of the consumption and the production in a smart electrical grid. Such forecasting models may relate to the short-term prediction of production and/or consumption. Furthermore, ramp regulators may be used to limit a load on a network and to improve the stability thereof. Such ramp regulators may also need an adequate short-term forecasting of the production side.

The accurate estimation of energy yields has become an important challenge for power plants and/or grids that are strongly dependent on stochastic phenomena. For example, wind farms and solar plants depend heavily on meteorological variables such as wind, clouds, and solar irradiation distribution, which can vary both locally and globally for a given site. An efficient on-line plant control may require a prediction over a few days, e.g. in an efficient implementation that does not lead to substantial time and resource overheads. Furthermore, a good estimate of the yearly energy-yield prediction may be needed for planning future investments. For a long-term estimation, more time and resources may typically be available than for on-line prediction systems, but the computational requirements may also be much higher.

State-of-the-art models for yield estimation may rely on simplifications of stochastic phenomena to reduce the modelling effort and the computational time. As a result, yields may be systematically underestimated, e.g. due to the introduction of empirical loss percentages and margins to avoid overestimation. These margins may be typically around 10% for temporal resolutions below 1 h, which could constitute an unacceptable loss for a larger site.

However, a detailed modelling of all the dynamic effects affecting the power plant or grid may be difficult to achieve using state-of-the-art approaches. For example, the stochastic parameters that affect the performance, e.g. the energy yield, of an energy system might not allow for a fully analytical approach in which accurate results are obtained in a reasonable time. Post-processing of meteorological data to estimate a yearly energy yield may be a computationally intensive problem and the online estimation for controlling purposes, e.g. by maximum power point (MPP) tracking, may be nearly impossible without applying simplifications or approximations to reduce the complexity of the stochastic and/or dynamic factors influencing the system.

MPP trackers may use hill-climbing algorithms to maximize an instant power production. For example, by maximizing the instant power generation, the time-integrated power yield, i.e. the total produced energy, may also be tuned to some extent. However, energy producing systems, such as photovoltaic cells and modules, may be governed by thermal time constants in the order of seconds to minutes. The current state of the system, together with current environmental conditions, can affect future states. Therefore, maximizing the instant power may not always guarantee that the total energy outcome is optimal.

The ambient conditions to which a photovoltaic module is subjected during its operational life may significantly affect the performance of the module in the field. Variations of these conditions, e.g. year-by-year, daily, hourly and even in the second range, may have a non-negligible impact. Ambient conditions that are typically considered as the most important in this respect are moisture, temperature, and insolation.

The operational temperature has a strong impact on the potential energy yield of such modules, either through a reduction of the operational lifetime (e.g. reliability issues related to thermal cycling), or through suboptimal performance of the different cells in the module. Thermal cycling can mechanically stress the module and may cause cracking and delamination of the different layers in the module over time. Furthermore, the overall module temperature directly impacts the module performance, e.g. increased temperatures at the cell level negatively impact the overall performance, e.g. by a drop in open-circuit voltage ($V_{oc}$). Local spatial and/or temporal variations in illumination and/or temperature can cause mismatch between photovoltaic cells that are connected in series. The temperature can also significantly depend on insolation levels, such that the ambient conditions that affect the performance can be difficult to take into account due to their intricate correlations.

One can use solar resource databases of global horizontal radiation in prediction (or historical evaluation) of a photovoltaic energy system. However, radiation data from satellites may be significantly biased, depending on the place and the applied method. For example, photovoltaic forecasting services may provide regional day-ahead forecasts with hourly resolution to a grid operator. However, for operational monitoring and energy management, site specific forecasts may need to be available in, substantially, real-time and with a high time resolution. For example, time series models and ground-based sky images may be used for short-term predictions, while, for longer forecast horizons, forecasts based on cloud motion vectors from satellite data may be used.

In energy systems comprising photovoltaic components, dynamic shading, e.g. due to moving aerial objects, may need to be taken into account in detail. Such dynamic shading substantially affects, for example, the performance of flat silicon panels with fixed bypass diodes. Smart panels may, at least to some extent, alleviate the influence of this effect, but accurate modelling of the remaining impact is still useful.

Thermal behavior of the modules may also have a major effect on the performance. Intra-module temperature gradients can cause mismatches between cells, leading to loading issues. This is also directly influenced by changes in the ambient temperature. While cooling, e.g. due to ground winds, may improve the module output, this is another thermal factor that is difficult to model accurately, e.g. under fully dynamic conditions. For example, the air flow at the surface of the modules may be non-linear and non-uniformly distributed. Experiments in wind tunnels have also shown that a non-negligible heating effect due to the friction in the boundary layer close to the module surface may exist.

Photovoltaic forecasting techniques can rely on black-box models. For example, a large volume of training data may typically be used to calibrate and tune the prediction models for a given set of measurement variables, such as meteorological data, e.g. a macroscale temperature, wind conditions and/or data derived from satellite images. Typically, such black-box models may use some form of neural network algorithms. The tuned black-box models can then be used to extrapolate the expected energy yield in a runtime situation. However, a black-box approach may imply an unsafe extrapolation, since the behavior of the model under untrained conditions cannot be guaranteed. On the other hand, a physics-based bottom-up approach could ensure a sound behavior of the model within the bounds of the physical properties taken into account, but, in accordance with state-of-the-art methods, would be difficult or infeasible to implement due to the computational complexity.

Furthermore, simplified engineering models for photovoltaic arrays and systems can be used. However, the module parameters are typically determined using module-specific flash tests for different temperatures and irradiance levels or field measurements. Therefore, such models may be unreliable, particularly when applied to a measured sub-hourly irradiance value. For the overall photovoltaic system, prior-art models may allow the modelling of an inverter efficiency as a function of DC power and voltage. However, simple models may not be available for more complex distributed topologies, such as module-integrated DC-DC converters with a central DC-AC conversion step.

State-of-the-art PV cell, module and array modelling may be based on the conventional equivalent circuit models, in which parameters are determined from data sheets for standard test conditions (STC). Specific deviations from the STC, such as due to the solar spectrum, reflection losses and/or the temperature distribution over the module are sometimes neglected. For example, spectral effects can introduce an uncertainty on the system yield of up to 5% annually. While information for spectral modelling can be inferred from satellite data, such methods may still require an extensive validation.

The photovoltaic module temperature is determined by environmental factors, and its influence on the energy yield depends on the solar cell technology. Thermo-electric and multi-dimensional simulation models can be used for photovoltaic devices. Thermal models of a photovoltaic module have also been disclosed to predict the performance and efficiency of the cell. However, such models may rely on some assumptions, such as a uniform temperature of each layer with negligible thermal capacitance and similar simplifications for transient simulations.

A need exists in the art for combined validated models that account for fine-grained spatial and temporal optical, thermal and electrical phenomena on the level of a photovoltaic module. For yield calculations, inverters may be modelled by their efficiency as a function of DC power and voltage. The interaction with the photovoltaic array may be described by the MPP tracking efficiency and assessed according to EN 50530.

Uncertainty information for the modelling chain from irradiance data to power yield can be of importance for photovoltaic project finance. The estimated standard deviation of photovoltaic yield calculations, in accordance with prior-art methods, can be around 4.5%, with estimated standard deviations between 0.5% and 3% in the modelling steps.

For approaches focusing on energy yield forecasting over longer periods, e.g. with a relatively low resolution, such as using hourly data, the errors on short-term non-linearities and thermal effects may be averaged out. Thus, a reasonable accuracy can be achieved using relatively simple techniques, e.g. black box regression models. However, even for forecasting over longer time frames, a higher time resolution may be desirable.

Therefore, a clear need exists in the art for more detailed and more accurate energy system models, such as solar resource models, e.g. to quantify the meteorological influence on the performance of current and new solar cell technologies. This includes a need for accurate but fast models for the solar spectrum and the direct/diffuse relationship. For PV cell, module and array modelling, a model can incorporate reflection, the spectrum, temperature distribution and shading effects. A realistic electrical-thermaloptical module model, e.g. using 3D finite element modes allowing for steady state and transient calculations, may be desirable. For the inverters, a need exists for accurate models integrating the dependency of inverter efficiency on DC voltage and the MPP tracking efficiency. Long-term dynamic and discrete parameters, such as degradation or forced outage, can be taken into account in the models, e.g. by stochastic modelling. However, it would be beneficial to improve on the models currently available for the emerging distributed topologies, such as module-integrated DC-DC converters with a central DC-AC conversion step.

SUMMARY

It is an object of embodiments of the present disclosure to provide devices and methods for determining a plurality of operating scenarios, e.g. system scenarios, of an energy system, such as an electrical grid, an energy consumer or plurality of energy consumers, an energy producer or plurality of energy producers, e.g. a power plant (using, for example, a renewable energy source), a load regulator on an electrical network, e.g. a ramp regulator, or a combination of one or more of the aforementioned energy systems.

It is a potential benefit of embodiments of the present disclosure that a compact and efficient representation of operating conditions of the energy system can be defined, e.g. even when taking a large space of parameters and/or stochastic variables into account.

It is a potential benefit of embodiments of the present disclosure that, by identifying operating scenarios and/or clustering operating conditions, run-time decisions regarding the operation of the energy system can be made in a computationally efficient manner. For example, the identification and/or clustering can be computationally intensive, but may be performed once for an energy system in order to provide manageable operating scenarios to be used under run-time conditions.

It is a potential benefit of embodiments of the present disclosure that the plurality of operating scenarios may be particularly suitable for on-line control by a maximum power point tracker, e.g. of a photovoltaic system or a power plant using a renewable energy source. For example, the plurality of operating scenarios may enable an efficient global tuning of the energy system, e.g. avoiding local optima different from the global optimum that could be selected based on a gradient-descent algorithm, a hill-climbing algorithm or a similar algorithm prone to problems associated with local extrema, ridges and alleys of the cost function as function of a parameter space and/or plateaus where the cost function is substantially flat as function of the parameter space. Particularly, use of the operating scenarios may enable real-time, or sufficiently fast, decisions in the control of the system with limited computational resources.

It is a potential benefit of embodiments of the present disclosure that a bottom-up approach can be used for characterizing and/or controlling an energy system, e.g. relying on physical principles instead of black-box machine learning methods, even in view of a large parameter space.

It is a potential benefit of embodiments of the present disclosure that specific environmental conditions of an energy system can be efficiently taken into account, e.g. that a location-specific optimization of the energy system can be achieved.

It is a potential benefit of embodiments of the present disclosure that a simple and low-cost approach for control of an energy system can be provided that achieves a good precision.

It is a potential benefit of embodiments of the present disclosure that a simple and low-cost approach for energy yield prediction and/or evaluation of an energy production system based on stochastically variable environmental factors, e.g. a photovoltaic or wind energy harvesting system, can be provided. For example, such prediction and/or evaluation model may take physical properties of the system and local measurements of environmental factors into account.

It is a potential benefit of embodiments of the present disclosure that low estimation errors can be achieved in a computationally efficient estimation framework for energy systems.

It is a potential benefit of embodiments of the present disclosure that a good scalability in terms of the size and complexity of an energy system can be achieved for estimation or evaluation of the performance thereof.

It is a potential benefit of embodiments of the present disclosure that WHAT-IF explorations for energy systems, such as photovoltaic modules with different materials or different configurations, can performed efficiently.

It is a potential benefit of embodiments of the present disclosure that efficient modelling for exploring smart photovoltaic topologies with controllable configuration parameters under dynamic irradiation conditions can be achieved.

It is a potential benefit of embodiments of the present disclosure that site-specific and/or local information, e.g. relating to irradiation and local environmental conditions, can be efficiently integrated in a performance estimation model of an energy system.

It is a potential benefit of embodiments of the present disclosure that a net energy production and/or consumption depending on local weather conditions (e.g. clouds, ambient temperature and wind direction/strength) can be accurately predicted.

It is a potential benefit of embodiments of the present disclosure that short-term forecasting of the production side of a ramp regulator for limiting the load on an electrical network and/or for guaranteeing the stability of the network can be achieved.

The above objectives can be accomplished by a method and device according to the present disclosure.

In a first aspect, the present disclosure relates to a computer-implemented method for determining a plurality of operating scenarios of an energy system. The method comprises obtaining a plurality of performance measures of the energy system as a function of time corresponding to a plurality of sets of values of input variables. The method comprises clustering the plurality of sets of values of the input variables and the performance measures associated therewith into groups. The method also comprises defining a descriptor for each of the groups and outputting the descriptors of the groups for use in an online prediction or offline estimation of the energy system, e.g. of performance of the energy system.

In a method in accordance with embodiments of the present disclosure, the plurality of performance measures may comprise a same performance measure, i.e. representative of a same physical or mathematical quantity, as calculated for each corresponding set of the plurality of values.

In a method in accordance with embodiments of the present disclosure, the plurality of performance measures may comprise an energy yield and/or an energy consumption estimate, e.g. as calculated for each set of the plurality of values.

In a method in accordance with embodiments of the present disclosure, the energy system may comprise an electrical grid, at least one energy consumer, at least one energy producer, an energy network regulator, or any combination thereof. The energy system may comprise an energy producer that harvests energy from a renewable energy source. The energy system may comprise a photovoltaic plant, a photovoltaic system, a photovoltaic module and/or a photovoltaic cell. The energy system may comprise a wind turbine or a wind turbine plant. The energy system may comprise an ocean wave energy harvesting system.

In a method in accordance with embodiments of the present disclosure, the input variables may comprise an ambient temperature, a wind direction, a wind speed, an ambient humidity, a solar irradiation intensity, a solar irradiation angle, at least one value representative of a solar spectrum, a clouding value, a shading value, and/or any combination thereof.

In a method in accordance with embodiments of the present disclosure, the input variables may comprise configuration parameters and/or properties of the energy system in operation, the energy system being a reconfigurable energy system.

A method in accordance with embodiments of the present disclosure may comprise using the descriptors of the clusters in an online prediction and/or offline estimation of the performance measure of the energy system by determining the group to which a current set of values of the input variables under evaluation are assigned and using the corresponding performance measure as indicative of the performance of the energy system.

In a method in accordance with embodiments of the present disclosure, using the descriptors of the clusters in an online prediction of the energy system may comprise controlling controllable parameters of the energy system in accordance with controllable parameters that are associated with the determined group to which the current set of values of the input variables are assigned.

In a method in accordance with embodiments of the present disclosure, each set of the plurality of sets of values of the input variables may comprise at least one time series of at least one input variable over a predetermined time frame. The plurality of performance measures may be determined as a function of time over the predetermined time frame and/or may be aggregated over the time frame.

In a method in accordance with embodiments of the present disclosure, obtaining the plurality of performance measures may comprise down-sampling at least one of the at least one time series by partitioning an evolution of the input variable or a plurality of the input variables over the predetermined time frame into a plurality of discrete time segments.

In a method in accordance with embodiments of the present disclosure, the down-sampling may comprise performing an optimization process to determine the time segments having a non-uniform length. The optimization process may comprise an optimization of a cost function comprising a factor or term indicative of a goodness-of-fit of the down-sampled curve and/or a factor or term indicative of a goodness-of-fit of the statistical distribution of the down-sampled variable or variables and/or a factor or term indicative of a smoothness of the variable or variables at its temporal resolution before down-sampling within each time segment.

In a method in accordance with embodiments of the present disclosure, the clustering may comprise, for each of the plurality of sets of values of the input variables and the performance measures associated therewith, determining summary statistics for the values and/or the performance measure and defining a point in a multidimensional space in which the clustering is performed, in which the coordinates in the multidimensional space of the point comprise the summary statistics.

In a method in accordance with embodiments of the present disclosure, the clustering may comprise determining a similarity metric between points in the multidimensional space and determining the groups based on this similarity metric, in which the similarity metric comprises a hyperdistance measure in the multidimensional space.

In a method in accordance with embodiments of the present disclosure, the clustering may comprise an iterative clustering, in which the groups are iteratively created and/or updated. In each clustering step, e.g. of the iterative clustering, points in the multidimensional space that are not successfully assigned to a group may be flagged for re-evaluation in a further clustering step, e.g. a following clustering step of the iterative clustering.

In the clustering of a method in accordance with embodiments of the present disclosure, a number of points assigned to each group may be, in each clustering step or in each clustering step except the last clustering step (of the iterative clustering), constrained by a predetermined maximum number. If the number of points in a group exceeds the predetermined maximum number, when evaluating a point for adding to a group, a new group may be created from that point, e.g. initially consisting of that point.

In a method in accordance with embodiments of the present disclosure, each clustering step of the clustering may comprise determining spatial properties of each group and taking the spatial properties into account to calculate a relative cost for deciding whether a point is included in the corresponding group or not. The point may be flagged for the re-evaluation in the further clustering step if the relative cost exceeds a predetermined threshold.

In a method in accordance with embodiments of the present disclosure, the step of obtaining the plurality of performance measures may comprise simulating a multi-physics model of the energy system for at least one set of the plurality of sets of values of the input variables over time.

In a method in accordance with embodiments of the present disclosure, the step of obtaining the plurality of performance measures may comprise, for a performance measure for which an occurrence probability of the corresponding set of values of the input variables is below a predetermined threshold, applying an approximation to calculate the performance measure instead of simulating the multi-physics model.

In a second aspect, the present disclosure relates to a device for determining a plurality of operating scenarios of an energy system. The device comprises an input for obtaining a plurality of performance measures of the energy system as a function of time corresponding to a plurality of sets of values of input variables. The device comprises a processor for clustering the plurality of sets of values of the input variables and the performance measures associated therewith into groups, and for defining a descriptor for each of the groups. The device comprises an output for outputting the descriptors of the groups for use in an online prediction or offline estimation of the energy system.

In a device in accordance with embodiments of the present disclosure, the input may be adapted for receiving each set of the plurality of sets of values of the input variables, in which each set comprises at least one time series of at least one input variable over a predetermined time frame. The input may comprise a simulator for determining the plurality of performance measures as a function of time over the predetermined time frame and/or aggregated over the time frame.

Particular aspects of the disclosure are set out in the accompanying independent and dependent claims. Features from the dependent claims may be combined with features of the independent claims and with features of other dependent claims, in addition to those aspects explicitly set out in the claims.

These and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

Figure 1:
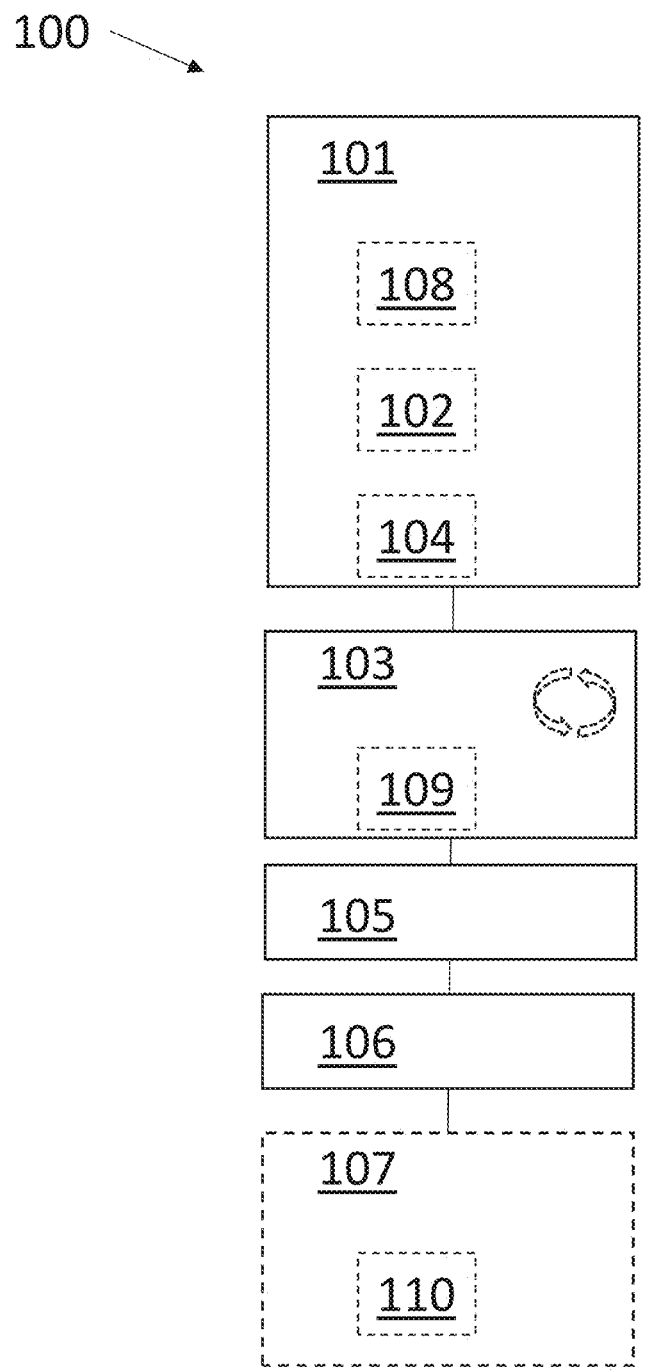
FIG. 1 shows a method, according to an example embodiment.

The drawings are only schematic and are non-limiting. In the drawings, the size of some of the elements may be exaggerated and not drawn on scale for illustrative purposes.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

In a first aspect, the present disclosure relates to a method for determining a plurality of operating scenarios of an energy system, such as an electrical grid, an energy consumer or plurality of energy consumers, an energy producer or plurality of energy producers, an energy network regulator, e.g. a ramp regulator, or any combination thereof. The electrical energy systems referred to in the present disclosure may particularly relate to energy systems that are dependent on stochastic dynamic variables, e.g. having a yield and/or load that depends on ambient parameters. For example, the energy system may comprise, or be dependent on, renewable energy sources, e.g. distributed renewable energy sources.

Methods in accordance with embodiments of the present disclosure can be computer-implemented methods. Unless specifically stated otherwise, as apparent from the following discussions, it is appreciated that, throughout the specification, terms such as "ascertaining," "processing," "computing," "calculating," "determining," or the like, can refer to the action and/or processes of a computer or computing system, or a similar electronic computing device, that can manipulate and/or transform data represented as physical, such as electronic, quantities into other data similarly represented as physical quantities.

In a similar manner, the term "CPU" and "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors. For example, a method in accordance with embodiments of the present disclosure may be executed by a computer comprising one or more processors and/or on a cluster of computers operating as a parallel computing system. Steps of the present method may be performed by one or more conventional processors, i.e. a CPU or CPUs, or by specialized processors, such as one or more general-purpose graphics processing units (GPGPU), cell broadband engine processors, application-specific integrated circuits, field-programmable gate arrays and/or other processing devices.

The methodologies described herein are, in one embodiment, performable by a machine which includes one or more processors that accept computer-readable (also called machine-readable) code containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include an audio output device, and a network interface device. The memory subsystem thus includes a carrier medium that carries computer-readable code (e.g., software) including instructions for performing, when executed by the processing system, one of more of the methods described herein. It is to be noted that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

It is to be noted that those skilled in the art will understand that many of the components described herein above may be included, but are not explicitly shown or described in order not to obscure the inventive aspect.

Aspects of the present disclosure may take the form of a method, an entirely hardware embodiment, an entirely software embodiment or an embodiment combining software and hardware aspects. Furthermore, the present disclosure may take the form of a carrier medium (e.g., a computer program product on a computer-readable storage medium) carrying computer-readable program code embodied in the medium. The software may further be transmitted or received over a network via the network interface device. While the carrier medium is shown in an embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Referring to FIG. 1, a method 100 in accordance with embodiments of the present disclosure is shown.

The method 100 comprises obtaining 101 a plurality of performance measures of the energy system as a function of time corresponding to a plurality of sets of values for input variables, e.g. each set of values corresponding to combination of values for the input variables.

The plurality of performance measures may comprise energy estimates, e.g. energy production (e.g. energy yield) and/or energy consumption estimates.

The plurality of performance measures may be determined as a function of time over a predetermined time frame. The performance measure and the set of values of the input variables associated therewith may be referred to as a run-time situation (RTS). For example, such run-time situation may correspond to an evolution of the performance measure in a predetermined time frame in accordance with the set of values of the input variables associated therewith. The run-time situation may consist of a plurality of time segments, e.g. a partition of the predetermined time frame, for which the set of values of the input variables and/or values of the performance measure are defined. Additionally or alternatively, the performance measure may comprise a scalar value representative of a global performance aggregated, e.g. integrated, over the predetermined time frame.

Each of the plurality of sets of values of the input variables may comprise a time series of at least one input variable, e.g. time series of the input variables, over the predetermined time frame.

For example, the predetermined time frame may have a time length in the range of 1 minute to 1 hour, e.g. in the range of 5 minutes to 30 minutes, e.g. in the range of 10 minutes to 20 minutes, e.g. 15 minutes. The time series may be defined in an initial temporal resolution of, for example, 0.5 s to 10 s, e.g. about 1 s.

The input variables may comprise stochastic environmental variables, such as weather variables, e.g. an ambient temperature, a wind direction, a wind speed, an ambient humidity, a solar irradiation intensity, a solar irradiation angle, a solar spectrum or parameter(s) representative of the solar spectrum, a clouding and/or shading variable(s) and/or any combination thereof.

The input variables may also comprise parameters of the energy system, e.g. settings of a reconfigurable energy system and/or properties of the energy system in operation. For example, the input variables may comprise a current, a voltage and/or other electrical characteristics of the system.

The input variables may comprise intermediate variables derived from any of the aforementioned input variables or combinations thereof, e.g. of exogenous variables, such as weather conditions, and/or of endogenous variables such as electrical characteristics. For example, such intermediate variables may include statistical variables calculated on the basis of one or more of such variables, e.g. measures of statistical centrality, dispersion (e.g. of spread), skew and/or curtosis.

Obtaining the plurality of performance measures may comprise simulating the energy system for each set, or at least one of the sets, of values of the input variables over time. For example, the simulation may comprise simulating 102 a detailed, non-uniform and/or fine-grained transient multi-physics model, e.g. an electrical-thermo-optical model. For example, the simulation may correspond to a simulation as described in EP 2,998,756.

For example, for a photovoltaic system, the simulation model may use predicted or historical weather data. Irradiance, ambient temperature, equivalent-uniform global wind speed and direction (as approximation of the typical non-uniform conditions) may be provided as input variables. Spectral information and sky temperature may also be included, e.g. to achieve an improved accuracy. The simulation model may comprise a layer-by-layer optical absorption model to calculate the generated heat and potential electrical energy in each layer of the photovoltaic module(s). The angular and spectral information may also be taken into account, at a relatively low computational cost. The temperature of each solar cell within a module may be calculated by an equivalent thermal circuit model. This thermal circuit may contain the relevant physical properties of the PV module, such as physical dimensions, the thermal capacity and/or the resistance of the materials. The values of the circuit model can comprise purely physical values or can be extracted from measurements. This circuit may take conduction, convection, and/or radiation of heat into account. Each thermal circuit may be coupled to the thermal circuit of its neighboring solar cells, to simulate the conduction of heat in lateral and/or longitudinal directions. The circuit may use the generated heat in each layer, calculated by the optical absorption model, as input. Wind tunnel tests and finite element model (FEM) simulations may be used to determine the relation between a global uniform wind speed and the spatially resolved heat transfer coefficient at the surface of the module. Thus, the temperature of each solar cell within the module may be simulated accurately for highly varying, non-uniform conditions, e.g. as provided by the input variable values, and this with high spatial (e.g. per cell) and temporal (e.g. up to 1 sec) resolution.

The electrical characteristics of each solar cell may be modeled by a 1 or 2-diode model. The parameters of such models may be determined by flash or steady-state IV measurements, and/or from device simulations. The thermal circuit, as described hereinabove, may be used to calculate the temperature of each solar cell in a PV module for use as an input parameter of the electrical circuit. A full electrical-thermal model of a PV module may be formed by coupling the individual electrical circuits.

Thus, the simulation model may estimate the production of individual solar cells, panels and parks using a physics-based photovoltaic energy yield model with fine-grained temporal and spatial resolution. However, other simulation models may be used for simulating other types of energy resources, e.g. wind turbines, ocean wave energy harvesting systems and/or hybrid systems. Similarly, simulation models may be used for simulating an energy consumption, an energy production, another performance measure of an energy system, and/or a combination thereof.

Obtaining 101 the plurality of performance measures may comprise, for performance measures (e.g. RTSs) that appear only infrequently, e.g. for which an occurrence probability can be calculated for the corresponding set of values of the input variables that is below a predetermined threshold, applying 104 a less detailed model than the model used for the step of simulating 102, e.g. a conventional crude overestimate of the performance measure, to efficiently use the available computational resources.

For example, a detailed electrical-thermo-optical model used in the step of simulating 102 may incorporate temporally and/or spatially fine-grained transient irradiance, local ambient temperature and wind effects. For example, accurate RC characteristic curves may be simulated based on a set of values for such input variables.

In a method in accordance with embodiments of the present disclosure, the performance measure as a function of time, e.g. the RC curve or a curve derived from the RC curve, may cover a predetermined time frame, e.g. a time window, partitioned into discrete time steps, e.g. into a plurality of time segments.

Obtaining 101 the plurality of performance measures may comprise down-sampling 108 at least one of the input variables and/or intermediate variables, for example by partitioning an evolution (e.g. a curve as function of time) of at least one of the input variables and/or of at least one intermediate variable for calculating the performance measure based on one or more input variables, e.g. a Silicon temperature of a photovoltaic cell, over the time window in which the performance measure is calculated, into a plurality of discrete time segments. For example, the variable may be an input variable or a variable derived from such input variable, e.g. an irradiation, a temperature, a wind speed, a wind vector or a value derived therefrom.

For example, the evolution over time of the plurality of input variables may be partitioned into a plurality of discrete time segments, e.g. the same time segments for a plurality of correlated variables. Since times series of the input variables can be highly correlated, a plurality of time segments may be determined that are suitable for expressing multiple input variables with a potentially low number of time steps. For example, such correlation may be due to governing physical equations that relate such input variables, e.g. a correlation between temperature and insolation.

For example, the time resolution may be reduced by defining the plurality of discrete time segments such that the dynamic evolution of the input variable over the time window can be described by a potentially small amount of time steps. For example, the variable may be averaged in each time segment to reduce the number of data points.

Partitioning 108 the evolution of the at least one variable over the time window into a plurality of discrete time segments may comprise determining for each time segment a value representative of the variable in that time segment, e.g. an average. Partitioning 108 the evolution of the at least one variable into the plurality of discrete time segments may also comprise associating a plurality of values with each time segment, such as an initial value of the variable corresponding to the lowest time value in the time segment, a final value of the variable corresponding to the highest time value in the time segment and/or other meta-variables or descriptors of the time segment, e.g. a standard deviation or other measure of statistical dispersion and/or a dominant frequency or frequency spectrum of change of the variable within the time segment.

For example, for thermal variables, the values associated with the time segment, e.g. the meta-variables, may enable an efficient calculation of the performance measure, such as by allowing an efficient calculation of an RC constant of the system and/or quantities associated with forced convection, e.g. wind cooling.

The time segments, e.g. the discrete time steps, may be constant in length or may be variable, e.g. at least two time steps may differ in length. Thus, the step of partitioning 108 may comprise a conventional down-sampling of the temporal resolution, or may comprise an optimization process to determine appropriate time segments of non-uniform length. For example, the optimization process may optimize a suitable cost function (or objective function). For example, the optimization process may determine a plurality of time segments, in which each time segment is selected to have a length in a predetermined range, e.g. a range selected via a user interface. The number of time segments may be predetermined, freely determined by the optimization process or determined by the optimization process within a predetermined range, e.g. selected via a user interface.

Figure 4:
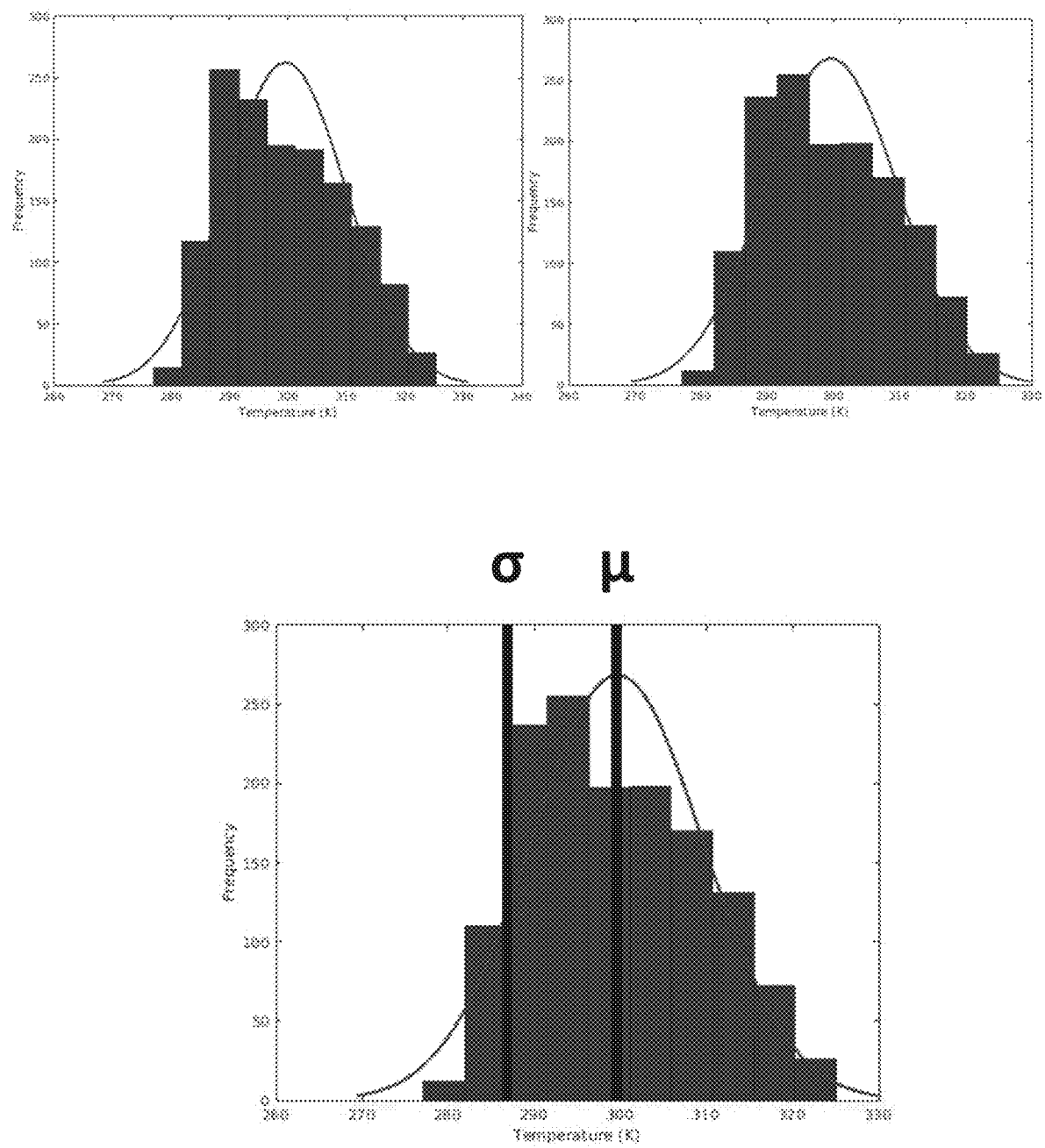
FIG. 4 shows fitted distributions of an input variable, according to an example embodiment.

Partitioning 108 the evolution over time of the at least one variable may comprise performing an optimization of a cost function, e.g. a cost function comprising a factor or term indicative of a goodness-of-fit of the down-sampled curve of the variable or variables with respect to the curve of the variable(s) in its initial temporal resolution. The cost function may comprise, additionally or alternatively, a factor or term indicative of a goodness-of-fit of the statistical distribution of the down-sampled variable(s) with respect to the statistical distribution of the variable(s) at its initial temporal resolution. For example, FIG. 4 shows fitted distributions based on discretizations of a variable, e.g. temperature, in the plurality of time segments. The cost function may comprise a term or factor indicative of a smoothness of the variable(s) at its initial temporal resolution within each time segment.

The time segments may be determined to have a length in the range of 0.5 s to 120 s, e.g. in the range of 1 s to 60 s, e.g. in the range of 1 s to 10 s.

For example, the input variable or variables may have a dynamic behavior, e.g. including delay effects, such as, for example thermal variables. A fluctuation of the (time) gradient of the variable may be used to detect the time segments of variable length. For example, a predetermined margin M (e.g. a relative margin, which may be expressed in percentage) may be used that defines an allowable deviation of the time length of the time segments. Different values of margins may be used for different input variables. The length of a time segment may be selected in terms of an expected behavior of the variable(s) and may be optimized by a closed-loop algorithm of minimizing a final error by optimizing at least one hyperparameter.

For example, prior to determining the time segments of variable length, the input variable or variables may be filtered, e.g. to remove high-frequency noise. A time gradient (e.g. by a discrete temporal difference operator) may be calculated for the time series of the variable or variables. The gradient(s) may be transformed, e.g. for example, by calculating grad(Z)/abs(grad(Z)), where Z refers to the (possibly filtered) variable at hand, such that a pulse train of values [−1, 0, 1] is created, in which a switch in sign signifies a switch from ascending to descending behavior and vice versa. Then, consecutive repeated values may be removed to create a pulse train vector, with preservation of the corresponding time stamps, of only changing signs (i.e. changes between the −1, 0, 1 states).

Thus, by sequentially traversing the reduced pulse train vector and its associated time stamps, time segments may be created that have a length in the range of [100−M, 100+M]/100 (for M expressed in percentage) times a predetermined segment length, or times an average segment length. For example, for each pulse of the reduced pulse train vector, if the current time segment is less that the predetermined lower threshold of 100%-M, the next time segment may be added to this current time segment. If the current time segment exceeds the upper threshold of 100%-M, a new time segment may be created for the next time segment.

This process may be applied in multiple iterations, e.g. two iterations, to combine temporally adjacent run-time scenarios that are below a predetermined lower threshold.

Such time segments may typically be much shorter than the initial time length of the time series, yet substantially larger than the initial time quantum of the time series, while retaining most of the dynamic behavior of the variable at hand. Other input variables may also be segmented based on the time segmentation of the variable at hand to retain alignment of variables, or the approach may be extended to take into account simultaneous approximate changes in the dynamic behavior of the plurality of input variables, e.g. by averaging the pulse trains generated for a plurality of variables and rounding off the average to the integers −1, 0, 1.

Thus, the number of time steps in the predetermined time frame may be reduced while maintaining a good fidelity to the variable(s) at a high temporal resolution. For example, the statistical distribution of the discretized (e.g. down-sampled) variable(s) may be a good approximation of the statistical distribution of the variable(s) before performing the step 108.

The step of simulating 102 may be carried out at a lower temporal resolution, e.g. as determined by the time segments, such that a good computational efficiency can be achieved. For example, for each time segment the performance measure, e.g. an energy yield of the energy system, may be calculated.

Furthermore, the reduction of the temporal resolution may also result in a good distribution of parameters determined from the run-time scenario for clustering, e.g. resulting in an efficient clustering, as described further below.

Figure 2:
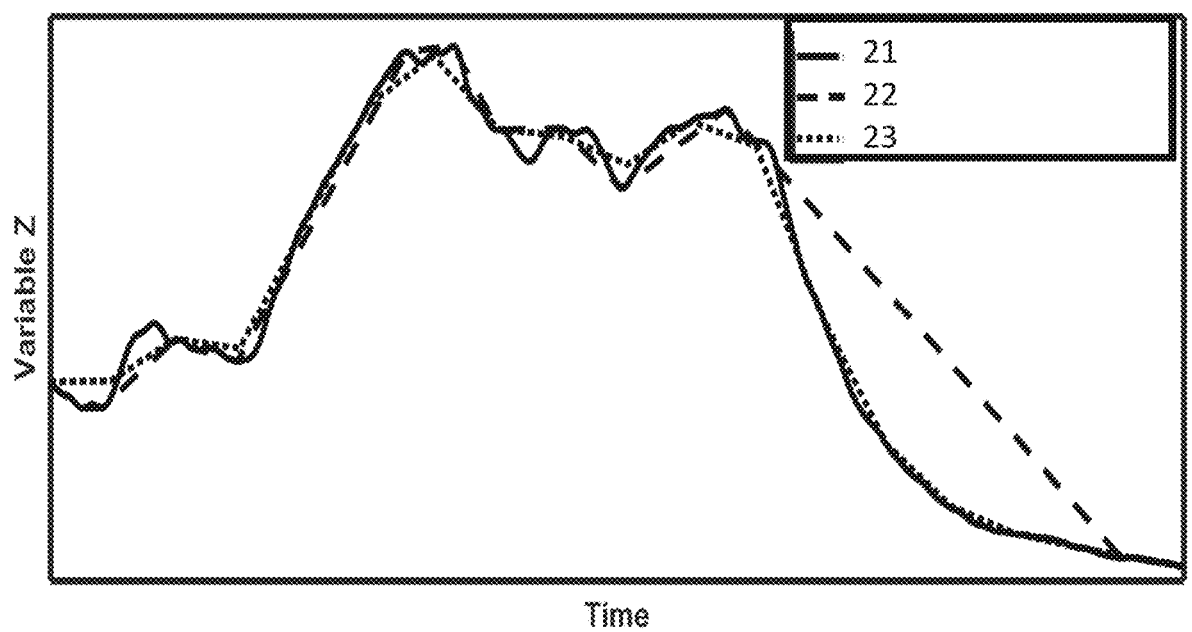
FIG. 2 shows a comparison between a high temporal resolution curve of a variable, the variable at a lower temporal resolution obtained by down-sampling into constant length time segments, and the variable at a lower temporal resolution obtained by using variable time steps, according to an example embodiment.

Referring to FIG. 2, a comparison is shown between a high temporal resolution curve 21 of the variable, e.g. a substrate temperature determined at a resolution of 1 s, a time plot 23 of the variable at a lower temporal resolution obtained by down-sampling into constant length time segments, and a time plot 22 of the variable at a lower temporal resolution obtained by using variable time steps.

The method 100 comprises clustering 103 the input variables and the associated performance measures, e.g. the run-time scenarios, into groups and defining 105 a descriptor for each cluster, e.g. a temporal system scenario (TSS). For example, sets of values for the input variables may be grouped in the step of clustering 103 such that a single performance measure is sufficiently representative for the group, e.g. within a predetermined tolerance margin of the error of the approximation of any performance measure in the group by the single performance measure representative for the group.

The step of clustering 103 may comprise determining 109 for the plurality of input variables, e.g. comprising time series of the input variables, summary statistics, e.g. measures of statistical centrality, dispersion (e.g. of spread), skew and/or curtosis, and defining a coordinate in a multi-dimensional space, where this coordinate comprises these summary statistics as well as the performance measure, e.g. the performance measure as a function of time and/or a summary statistic of this performance measure. The summary statistic(s) may refer to a statistic for summarizing (e.g. describing) the distribution of the value of the variable over the plurality of time segments. For example, a statistical distribution function may be fitted on the values of one or more of the input variables (and/or the performance measure) and may be represented by the parameters of the distribution function. Variables may be fitted in isolation, e.g. by a univariate distribution, or may be jointly fitted, e.g. by a multivariate distribution, for example to take advantage of correlations between such variables.

For example, the values for the input variables may be reduced to one value per variable per run-time scenario. This may comprise any form of pooling method, e.g. simple min/max operations or more statistical approaches, such as averaging or extraction of statistical parameters of a suitable statistical distribution from the sample.

For example, each run-time scenario may be represented by a coordinate $(\xi_1, \xi_2, \ldots \xi_N, \text{Cost})$ in a hyperspace, e.g. in which N coordinates are representative for the input variables and 1 coordinate is representative of the performance measure. However, including multiple coordinates per input variable or including multiple performance measures (e.g. expressing different properties of interest of the system) are not necessarily excluded in embodiments of the present disclosure. For example, embodiments of the present disclosure are not necessarily limited to scalar coordinates for the performance measure, e.g. multiple different performance measures may be included and/or multiple statistics indicative of the performance measure may be included. For example, different yet comparable performance measures indicative of different configurations of the energy system may be included.

The coordinates may comprise values of, or derived from, stochastic input variables indicative of environmental conditions, such as temperature, wind, irradiation, and/or shading, but may also comprise values of, or derived from, input variables indicative of controllable parameters of the energy system. For example, each cluster may be related to a set of values for the controllable parameters, e.g. the knobs of the energy system, e.g. in a parametrized way. For example, such controllable parameters may be related to conventional knobs, such as a voltage regulation (duty cycle) of a local/global DC-DC converter, or may be related to knobs of a smart energy system, such as a configuration for configurable topology elements of a smart PV module/panel (e.g. settings for smart bypass diodes and/or switches).

For example, the coordinate may comprise a mean temperature, a mean irradiation, a mean operating current, a mean operating voltage, and an energy yield. Likewise, the coordinate may also comprise a standard deviation of the temperature, a standard deviation of the irradiation, a standard deviation of the operating current, and/or a standard deviation of the operating voltage. Embodiments of the present disclosure are not limited to these examples, e.g. the coordinate may also comprise other input or intermediate variables and/or other statistical summary measures thereof. Examples of dimensions in the multi-dimensional space on which the clustering is performed may include a generated power and operating temperature at several locations.

For each of the plurality of sets of values for the input variables, which may comprise vector values, e.g. time series, a performance measure of the energy system as a function of time was obtained 101, e.g. by simulating 102 a detailed, non-uniform and/or fine-grained transient multi-physics model taking the input variables into account and/or by applying 104 the less detailed model, e.g. a rough estimation model, to at least one set of values for the input variables that have a low occurrence probability. As described hereinabove, at least one variable may be first down-sampled 108 before simulating 102. Thus, for each of the plurality of sets of values of the input variables, a coordinate in a multidimensional space may be defined for characterizing the combination of values for the input variables and the performance metric obtained for this combination. Each of the plurality of sets of values for the input variables may be representative of realistic meteorological conditions (and/or other conditions related to the performance) for the energy system, e.g. at the location of a module or plant. The values may be obtained by profiling and/or sampling the conditions over the time frame of interest, e.g. a time window for use in forecasting the performance. For example, detailed meteorological conditions at the location of interest may be available for use in a method in accordance with embodiments of the present disclosure, e.g. in a sufficiently detailed fine-grain format, e.g. up to sampling periods of a second. When the available granularity of the data is more crude, this may reduce the accuracy that can be achieved. However, a substantial reduction in the use of computational resources may still be achieved by a method in accordance with embodiments of the present disclosure, even if the accuracy that can be achieved is limited by the quality of the input data.

As described hereinabove, a search space of run-time scenarios can be constructed. By using a coarse approximation for less frequently occurring situations, a good sampling of the search space can be achieved while avoiding too much computational time being spent on a detailed simulation for such rare situations.

For example, transient effects, e.g. the memory/state of the system, may be efficiently described by a method in accordance with embodiments of the present disclosure. For each run-time scenario, the input data (e.g. irradiance, temperature, wind) along with a current state may be connected to future states in a deterministic way. Even though a large number of future states can exist, strongly depending on an evolution of ambient conditions, these states may branch out smoothly and many of these states may only occur rarely. Therefore, the performance of the energy system may be efficiently described by scenarios that occur sufficiently frequently to have a substantial impact on the overall performance, e.g. the energy yield.

Figure 3:
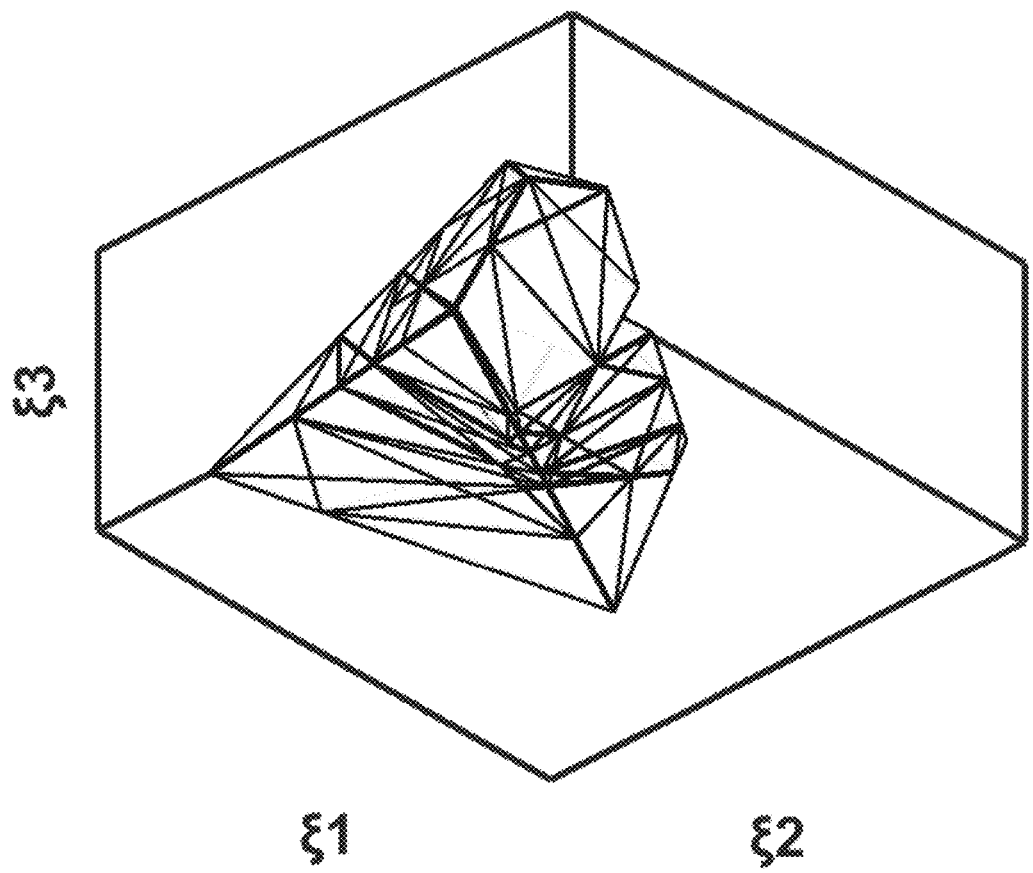
FIG. 3 illustrates run-time scenarios represented in a three-dimensional space according to an example embodiment.

FIG. 3 illustrates the run-time scenarios represented in a three-dimensional space $\xi_1, \xi_2, \xi_3$. However, it is to be noted that, in practice, the dimensionality of the search space may be larger than 3, e.g. it may have a dimension in the range of tens or even hundreds of dimensions. It is also to be noted that the cost, e.g. the performance measure, used for the clustering could be represented by the groups formed by the clustering, e.g. by polytope boundaries of regions in the space corresponding to the groups, which is, however, difficult to represent in a discernable manner in a black-and-white illustration as shown in FIG. 3.

The step of clustering 103 may comprise determining a similarity metric between points in the multidimensional space, e.g. between a pair (or n-tuples) of the points in the multidimensional space, and determining the clusters based on this similarity metric, for example using a clustering approach. The similarity metric may comprise (or consist of) a hyperdistance measure in the multidimensional space.

In the clustering 103, a distribution of points in the multidimensional space representative of the run-time scenarios may be divided into a plurality of different groups representing system scenarios. This division, e.g. partition, into different groups, e.g. S different groups, may be performed in accordance with an overall configuration cost. A point i may be assigned to a group j whenever its cost c(i) falls into a cost range for that group {C(j)min, C(j)max}.

Such cost range may be determined by a balancing function that ensures that all groups have a near-equal probability to occur at run-time. In this way, rare system scenarios may be avoided, e.g. since their storage cost could exceed the gains in terms of accuracy of the representation. This probability may be expressed by the number of points, including repeating ones, that the group contains, which will be referred to as a scenario size.

The clustering 103 may comprise an iterative clustering, in which the clusters are iteratively updated. For example, in each clustering step, points (e.g. RTSs represented by their coordinates) in the multidimensional space that were not successfully assigned to a cluster may be flagged for re-evaluation in a following clustering step. The number of clustering steps may be predetermined, e.g. by a user setting, or may be dynamically determined, e.g. by a stopping criterion. The number of points assigned to each cluster (e.g. in each clustering step or in each clustering step except the last one) may be constrained to a predetermined range.

For example, in each clustering step, clusters may be determined and reduced to a predetermined number K of points (e.g. to a predetermined upper limit to the cluster size). For example, the K points closest to the barycenter of the cluster may be selected and the remaining points, if any, may be rejected for re-evaluation in a following clustering step.

Furthermore, a predetermined margin may be applied, e.g. of 10% (embodiments not being limited thereto), to the relative scenario cost difference to determine whether a group is split, e.g. whether a point is added to a group under evaluation (e.g. when below the predetermined margin) or is used to start a new group (e.g. when above the predetermined margin). The relative scenario cost difference may be calculated by $(C_{current}-C_{low})/C_{low}$, where $C_{low}$ and $C_{current}$ refer to the lowest cost (e.g. the lowest performance measure) in the group respectively before and after adding the point to the group under evaluation.

For example, when adding a point to a cluster, a relative cost may be calculated indicative of the performance measure of the point with respect to the performance measures in the cluster. A point may be rejected when this relative cost is above a predetermined threshold, e.g. such as to ensure a predetermined accuracy within the cluster when representing the performance measure of any point in the cluster with its representative cluster value, e.g. a mean thereof.

In each clustering step, spatial properties of each cluster may be determined, such as values indicative of a center and a size in the multidimensional space, e.g. a barycenter and a radius. Such properties may be used as thresholds for deciding whether a point may be included in the cluster or not. For example, a larger spatial extent of a cluster, e.g. a larger radius, may result in a decreased accuracy, yet a gain in storage and computational efficiency when using such cluster, e.g. for (near) real-time forecasting.

The clustering may comprise a pre-processing step in which the RTS signatures, e.g. as represented by their coordinates in the multidimensional space, are sorted by their costs, e.g. by the performance measure, e.g. starting from a worst case. Thus, a worst case system scenario may be created. The system scenario may be filled in with points, i.e. RTS signatures, having the next costs in the sorted sequence. When the size of the system scenario exceeds a maximum threshold on the scenario size, a new system scenario may be created, and so on. Each completed group may be checked for overlap with previously calculated higher cost system scenarios. An overlap means that the scenario regions in the RTS parameter space are not disjoint, and equals the intersection of the regions. Such intersections may make a prediction ambiguous, and may thus be eliminated, e.g. by moving points in the overlap region to the higher cost system scenario, or, correspondingly, subtracting the overlap region from the lower cost scenario.

In a clustering step, an operation may be performed on an existing border of a group, e.g. on the convex hull, and the projection point of a new point that is added to the group onto the multidimensional parameter space. To limit the number of vertices in the hull for faster run-time prediction, a distance between the points on the convex hull may be calculated, and those points that are closer than a predetermined margin may be removed, e.g. where $L/v_{max}$ is below a predetermined threshold, where L is the perimeter of the hull and $v_{max}$ is a user defined constraint of the maximum number of vertices in the prediction polytope.

For determining overlap and region border adjustment, Boolean set operations may be applied for determining the intersection and difference of two polytopes.

Since the number of coordinate points in the multidimensional space, e.g. corresponding to the sampled run-time scenarios, may be large, the step of clustering may apply suitable big-data clustering and/or processing techniques, such as skyline queries.

Each group, i.e. cluster, that is determined in the clustering step characterizes the temporal system scenarios in that group in terms of its coordinates associated with the input values and performance measure, e.g. in a region of the multidimensional space. The descriptor associated with such group can be described by a polytope, e.g. by its convex hull. For example, the descriptor may comprise the vertices of the polytope. Thus, the descriptor may be efficiently used, e.g. in an online prediction or historical evaluation of performance, by checking which polytope contains a particular set of input values, e.g. a specific run-time scenario. Thus, a performance can be estimated for the particular set of input values. Checking if a point lies inside a polytope is a classical data point localization problem from the computational geometry domain, which can be executed at a low computational resource cost. Furthermore, a polytope can be stored at a low storage space cost, for example by a list of its vertices.

As described hereinabove, an iterative clustering may be applied to the sorted vector of signatures, e.g. sorted by a cost function, e.g. by the performance measure, in which a new group is started when a population criterion is met. The signatures may be assumed to be partitioned in equal numbers among the number of scenarios, e.g. such as to ensure similar occurrence ratios. However, instead of ensuring approximatively equal populations in the groups, in embodiments in accordance with the present disclosure, the clustering may focus on a good distribution of the final error, e.g. within each group, e.g. where a uniform distribution of the occurrence ratios may be considered of secondary importance.

For example, in each clustering step, an intra-group deviation, e.g. statistical spread, of the cost, e.g. of the performance measure, may be calculated. If a current signature cost deviates more than a predetermined, e.g. user-controllable, percentage from the first signature cost of the scenario (or a representative cost of the scenario, e.g. an average cost), the current group can be closed and a new group is opened for construction. This can be performed efficiently if the signature vectors are sorted by their cost, e.g. the performance measure, as described hereinabove.

Furthermore, since the input variables and their associated performance measures may be organized in the multidimensional space, e.g. by the correlations and/or dependencies, a hyper-distance measure may be used. In each clustering step, when adding a point, i.e. a signature, to a group, geometrical measures, such as the group barycenter and the group radius (e.g. the radius of an enclosing hypersphere) may be calculated, e.g. updated. When considering the point for inclusion in a group, e.g. after passing a criterion imposed on the cost (e.g. on the performance measure) as described hereinabove, the vicinity of the group, e.g. by the enclosing hypersphere, may be evaluated in terms of a vicinity criterion. If the point does not pass the vicinity criterion, e.g. is farther away from the group than a predetermined threshold, the point may be skipped and withheld for re-evaluation in a next clustering step. The same hypersphere can be used to define a lower bound on the geometrical size of a scenario, e.g. to avoid polytopes representative of the group having a volume that is too small, e.g. for which a storage and/or processing cost in use for prediction/historical evaluation would be insufficient relative to the added accuracy by inclusion of the group. Furthermore, such hypersphere representation may be used as to avoid convex hull operations between non-intersecting hypervolumes, thus reducing the implied processing time.

After an iteration of clustering steps is complete, a next clustering phase may be executed to create additional scenarios. For example, points which were close in terms of the performance measure (e.g. by evaluation of the points sorted by the performance measure), yet were found to lie at a hyper-distance greater than a threshold, may be withheld in the previous clustering step for re-evaluation. Thus, in the next clustering step, signatures with similar costs but located differently in the multidimensional space might not be clustered together but assigned to different groups, such that clusters, i.e. groups, which would have convex hulls that span unnecessarily large volumes can be avoided.

The iterative procedure of clustering may be repeated for a predetermined number of iterations, or may be repeated until no further points are withheld for re-evaluation. During each iteration, the predetermined hyper-distance and cost thresholds may be adjusted accordingly to ensure more relaxed or more strict conditions, e.g. to improve the efficiency of the clustering process.

The method 100 further comprises outputting 106 the descriptors of the clusters for use in an online prediction or offline estimation of the energy system, e.g. of the local energy yield for the energy system. Examples of dimensions in the multi-dimensional space on which the clustering is performed may include a generated power and operating temperature at several locations. The descriptors may thus be used, in an online operation, to determine the characteristics associated with the cluster to which a particular combination of operating temperatures at these locations corresponds. However, embodiments of the present disclosure may also use other relevant physical quantities or values derived therefrom which can be measured online or estimated in (substantially) real-time. Furthermore, the descriptors may also be used for historic evaluation or reevaluation of the performance of the system.

The method may also comprise using 107 the descriptors of the clusters in an online prediction or offline estimation of the energy system by, for a set of values of the input variables, e.g. corresponding to a current condition of the energy system in use, determining the cluster to which the set of values of the input variables are assigned and using the performance measure as indicative of the current and/or future performance of the energy system.

Furthermore, using 107 the descriptors of the clusters in an online prediction of the energy system may comprise controlling 110 controllable parameters of the system in accordance with controllable parameters that are associated with the determined cluster to which the values of the input variables are assigned. Thus, an online control of the energy system, e.g. comprising a smart PV topology, is disclosed. Decision-making may be performed by considering multiple costs, leading to a locally (in time and space) optimal approach for the configuration. By active control of the energy system at run-time, an energy production can be optimized. Furthermore, this optimization is not limited to an optimization of an instantaneously generated power, but may take an integrated estimated energy production over a future time frame into account, e.g. such that local yet non-global maxima of the energy production in a future time frame are efficiently avoided. For example, a predictive forecast model may be used to generate an irradiation and/or temperature profile for determining an input to determine the cluster corresponding to the current and near-future environmental conditions. Such a predictive forecast model may generate a profile with a horizon of a few minutes up to a few days. The profile data may, for example, be provided to a controller which has access to the descriptors (e.g. stored in a memory). Therefore, choices can be made in order to tune the system, e.g. by taking its past, present, and future states into account.

Methods for estimating the performance measure, e.g. an energy yield, can benefit from the descriptors provided by a method in accordance with embodiments of the present disclosure in online and/or offline applications. In the case of offline estimation, profiling results obtained from past meteorological databases and local I-V curve measurements may be of use for a site of interest to produce an accurate value for the performance measure, e.g. an expected yearly energy yield, of the considered or existing installation, e.g. to assist in making decisions concerning initial investments or future upgrades/expansions.

While a substantial improvement in forecasting efficiency could be realized by tightly combining weather and energy system forecasts, e.g. photovoltaic module or plant forecasts, the complexity of energy systems and their dependence on weather conditions may imply a high computational resource burden, such that an integrated forecasting system may be difficult, or too costly, to achieve. A bottom-up photovoltaic energy yield model, as briefly discussed hereinabove, may be very precise, even for very short timescales. A combination with weather/cloud forecasts could lead to significant precision improvements, e.g. due to the exploitation of correlations. In accordance with embodiments of the present disclosure, weather forecasts, e.g. fine-grained weather forecasts, which may be provided substantially real-time in accordance with embodiments of the present disclosure, may be used to index representative energy yields that are pre-calculated using such a bottom-up simulation framework. Furthermore, such weather forecasts (or forecasts of other environmental conditions) may be augmented by using inputs from local measurement sensors, e.g. at the level of PV panel integration, locally on-site and/or on the feeder/transformer level, to achieve an acceptable forecasting accuracy at an acceptable cost. Such sensor measurements may be used to improve the weather forecasts (or other environmental forecasts) or may be directly taken into account in indexing the representative pre-calculated energy yield.

By reducing the temporal resolution of the input data used for the simulations, the computational burden of exploring a large space of representative weather conditions can be reduced. By clustering the results of these simulations and the input variables associated therewith, a compact representation can be generated that can be easily used for reference in forecasting or historical evaluations, without imposing a large demand on computational resources and/or computing time, e.g. that can executed online on a cheap processor hardware platform. For example, accurate forecasts of actual energy yield may be realized for timeframes of, for example, in the range of about 15 minutes to a few hours, with detailed information on occurrences of sudden ramps.

The descriptors of the clusters may be used 107 in service or a product, e.g. by a device, in various applications, and for various types of users. For example, the descriptors may be used in short-term prediction or simulation solutions for power plant operators, aggregators, and/or energy providers. Furthermore, long-term prediction or simulation solutions may be integrated in smart home energy management and/or in management systems for industrial, municipality, and/or residential prosumers.

Figure 5:
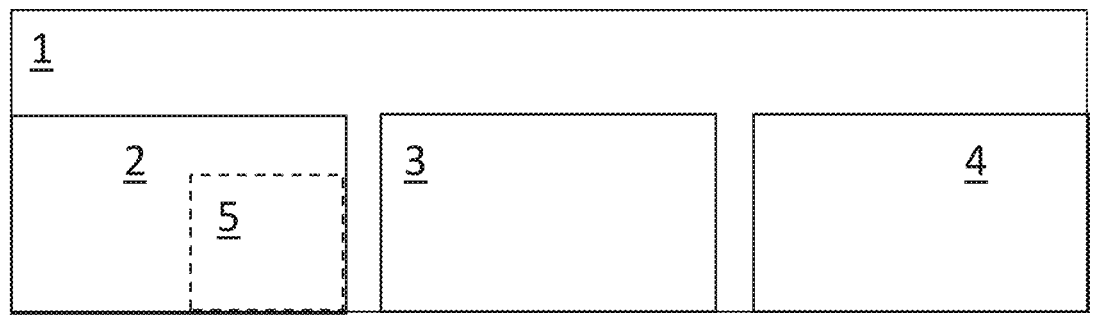
FIG. 5 schematically illustrates a device, according to an example embodiment.

In a second aspect, the present disclosure relates to a device for determining a plurality of operating scenarios of an energy system. A device 1 in accordance with embodiments of the present disclosure is illustrated in FIG. 5.

The device 1 comprises an input 2 for obtaining a plurality of performance measures of the energy system as a function of time corresponding to a plurality of sets of values of input variables.

The input 2 may be adapted for receiving each set of the plurality of sets of values of the input variables, in which each set of values comprises at least one time series of at least one input variable over a predetermined time frame.

The input 2 may be adapted for down-sampling at least one of the at least one time series by partitioning an evolution of the input variable or a plurality of the input variables over the predetermined time frame into a plurality of discrete time segments.

The input 2 may be adapted for, when down-sampling, performing a process to determine the time segments having a non-uniform length, in which this process comprises a tuning of a cost function comprising a factor or term indicative of a goodness-of-fit of the down-sampled curve and/or a factor or term indicative of a goodness-of-fit of the statistical distribution of the down-sampled variable or variables and/or a factor or term indicative of a smoothness of the variable or variables at its temporal resolution before down-sampling within each time segment.

The input 2 may comprise a simulator 5 for determining the plurality of performance measures as a function of time over the predetermined time frame and/or aggregated over the time frame.

The simulator 5 may be adapted for simulating a multi-physics model of the energy system for at least one set of the plurality of sets of values of the input variables over time.

The simulator 5 may be adapted for, for a performance measure for which an occurrence probability of the corresponding set of values of the input variables is below a predetermined threshold, applying an approximation to calculate the performance measure instead of simulating the multi-physics model.

The device 1 comprises a processor 3 for clustering the plurality of sets of values of the input variables and the performance measures associated therewith into groups, and for defining a descriptor for each of the groups.

The processor 3 may be adapted for, for each of the plurality of sets of values of the input variables and the performance measures associated therewith, determining summary statistics for the values and/or the performance measure and defining a point in a multidimensional space in which the clustering is performed, in which this coordinate in the multidimensional space of the point comprises the summary statistics.

The processor 3 may be adapted for determining a similarity metric between points in the multidimensional space and determining the groups based on this similarity metric, in which this similarity metric may comprise a hyper-distance measure in the multidimensional space.

The processor 3 may be adapted for performing an iterative clustering, in which the groups are iteratively created and/or updated. In each clustering step, points in the multidimensional space that were not assigned to a group may be flagged for re-evaluation in a further, e.g. a following, clustering step.

The processor 3 may be adapted for constraining a number of points assigned to each group, in each clustering step or in each clustering step except the last clustering step, to a predetermined maximum number. The processor 3 may be adapted for, if the number of points in a group exceeds the maximum number when evaluating a point for addition to the group, creating a new group that, initially, consists of only that point.

The processor 3 may be adapted for determining spatial properties of each group and taking the spatial properties into account to calculate a relative cost for deciding whether a point is included in the corresponding group or not. The processor 3 may be adapted for flagging a point for the re-evaluation in the further clustering step if the relative cost exceeds a predetermined threshold.

The device 1 comprises an output 4 for outputting the descriptors of the groups for use in an online prediction or offline estimation of the energy system.

The device 1 in accordance with embodiments of the second aspect of the present disclosure may perform a method, or at least a step thereof, in accordance with embodiments of the first aspect of the present disclosure. Therefore, features of a method in accordance with embodiments of the present disclosure, as described hereinabove, may apply equally to corresponding features of a device 1 in accordance with embodiments of the present disclosure, as shall be clear to the person skilled in the art. Thus, the device 1 may comprise a processing system adapted for performing the different method steps of method embodiments as described hereinabove. The different steps may be implemented in the processing system as hardware or as software. Such a processing system may include at least one programmable processor coupled to a memory subsystem that includes at least one form of memory, e.g., RAM, ROM, and so forth. A storage subsystem may be included that has at least one disk drive, e.g. a solid-state storage device and/or a magnetic storage disk, and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem. The memory of the memory subsystem may at some time hold part or all of a set of instructions that when executed on the processing system implement the step(s) of the method embodiments of the present disclosure. The present disclosure also includes a computer program product which provides the functionality of any of the methods according to the present disclosure when executed on a computing device. Further, the present disclosure includes a data carrier such as for example a CD-ROM, a DVD-ROM or a diskette which stores the computer product in a machine readable form and which executes at least one of the methods of the disclosure when executed on a computing device. Nowadays, such software is often offered on the Internet or a company Intranet for download, hence the present disclosure includes transmitting the computer product according to the present disclosure over a local or wide area network.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of

What is claimed is:

1. A method comprising:
obtaining a plurality of performance measures of an energy system as a function of time corresponding to a plurality of sets of values of input variables;
clustering the plurality of sets of the values of the input variables and the performance measures associated therewith into groups;
defining a plurality of descriptors corresponding respectively to the groups;
using the plurality of descriptors to predict a performance measure of the energy system by determining a group of the groups to which a particular set of values of the input variables under evaluation are assigned and using the performance measure as indicative of a performance of the energy system; and
controlling a parameter of the energy system in accordance with controllable parameters that are associated with the group,
wherein each set of the plurality of sets of values of the input variables comprises a time series of an input variable over a predetermined time frame, the method further comprising determining the plurality of performance measures as a function of time over the predetermined time frame and aggregating the plurality of performance measures over the predetermined time frame,
wherein obtaining the plurality of performance measures comprises down-sampling the time series by partitioning an evolution of the input variable over the predetermined time frame into a plurality of discrete time segments,
wherein the down-sampling comprises performing an optimization process to determine the time segments of the discrete time segments having a non-uniform length, wherein the optimization process comprises an optimization of a cost function comprising a factor indicative of a goodness-of-fit of a down-sampled curve and a factor indicative of a goodness-of-fit of a statistical distribution of a down-sampled variable and a factor indicative of a smoothness of the variable or variables at its temporal resolution before down-sampling within each time segment.

2. The method of claim 1, wherein the clustering comprises, for each set of the plurality of sets of values of the input variables and the performance measures associated therewith, determining summary statistics for the plurality of sets of values and/or the performance measure and defining a point in a multidimensional space in which the clustering is performed, where this coordinate in the multidimensional space of the point comprises the summary statistics.

3. The method of claim 2, wherein the clustering comprises determining a similarity metric between points in the multidimensional space and determining the groups based on this similarity metric, the similarity metric comprising a hyper-distance measure in the multidimensional space.

4. The method of claim 2, wherein the clustering comprises an iterative clustering, wherein the groups are iteratively created and/or updated, and wherein in each clustering step, points in the multidimensional space that were not assigned to a group are flagged for re-evaluation in a further clustering step.

5. The method of claim 4, wherein, in the clustering, a number of points assigned to each group is, in each clustering step or in each clustering step except the last clustering step, constrained by a predetermined maximum number, and wherein, if the number exceeds the maximum when evaluating a point for adding to a group, a new group is created from the point.

6. The method of claim 4, wherein each clustering step of the clustering comprises determining spatial properties of each group and taking the spatial properties into account to calculate a relative cost for deciding whether a point is included in the corresponding group, and wherein the point is flagged for the re-evaluation in the further clustering step if the relative cost exceeds a predetermined threshold.

7. The method of claim 1, wherein the obtaining the plurality of performance measures comprises simulating a multi-physics model of the energy system for a set of the plurality of sets of values of input variables over time.

8. The method of claim 7, wherein the obtaining the plurality of performance measures comprises, for a performance measure for which an occurrence probability of the corresponding set of values of input variables is below a predetermined threshold, applying an approximation to calculate the performance measure.

9. A device comprising:
an input configured for obtaining a plurality of performance measures of an energy system as a function of time corresponding to a plurality of sets of values of input variables; and
a processor configured to perform functions comprising:
clustering the plurality of sets of values of the input variables and the performance measures associated therewith into groups;
defining a plurality of descriptors corresponding respectively to the groups;
using the plurality of descriptors to predict a performance measure of the energy system by determining a group of the groups to which a particular set of values of the input variables under evaluation are assigned and using the performance measure as indicative of a performance of the energy system; and
controlling a parameter of the energy system in accordance with controllable parameters that are associated with the group,
wherein each set of the plurality of sets of values of the input variables comprises a time series of an input variable over a predetermined time frame, the functions further comprising determining the plurality of performance measures as a function of time over the predetermined time frame and aggregating the plurality of performance measures over the predetermined time frame,
wherein obtaining the plurality of performance measures comprises down-sampling the time series by partitioning an evolution of the input variable over the predetermined time frame into a plurality of discrete time segments,
wherein the down-sampling comprises performing an optimization process to determine the time segments of the discrete time segments having a non-uniform length, wherein the optimization process comprises an optimization of a cost function comprising a factor indicative of a goodness-of-fit of a down-sampled curve and a factor indicative of a goodness-of-fit of a statistical distribution of a down-sampled variable and a factor indicative of a smoothness of the variable or variables at its temporal resolution before down-sampling within each time segment.

10. The device of claim 9, wherein the clustering comprises, for each set of the plurality of sets of values of the input variables and the performance measures associated therewith, determining summary statistics for the plurality of sets of values and/or the performance measure and defining a point in a multidimensional space in which the clustering is performed, where this coordinate in the multidimensional space of the point comprises the summary statistics.

11. The device of claim 10, wherein the clustering comprises determining a similarity metric between points in the multidimensional space and determining the groups based on this similarity metric, the similarity metric comprising a hyper-distance measure in the multidimensional space.

12. The device of claim 10, wherein the clustering comprises an iterative clustering, wherein the groups are iteratively created and/or updated, and wherein in each clustering step, points in the multidimensional space that were not assigned to a group are flagged for re-evaluation in a further clustering step.

13. The device of claim 12, wherein, in the clustering, a number of points assigned to each group is, in each clustering step or in each clustering step except the last clustering step, constrained by a predetermined maximum number, and wherein, if the number exceeds the maximum when evaluating a point for adding to a group, a new group is created from the point.

14. The device of claim 12, wherein each clustering step of the clustering comprises determining spatial properties of each group and taking the spatial properties into account to calculate a relative cost for deciding whether a point is included in the corresponding group, and wherein the point is flagged for the re-evaluation in the further clustering step if the relative cost exceeds a predetermined threshold.

15. The device of claim 9, wherein the obtaining the plurality of performance measures comprises simulating a multi-physics model of the energy system for a set of the plurality of sets of values of input variables over time.

16. The device of claim 15, wherein the obtaining the plurality of performance measures comprises, for a performance measure for which an occurrence probability of the corresponding set of values of input variables is below a predetermined threshold, applying an approximation to calculate the performance measure.

17. A non-transitory computer readable medium storing instructions that, when executed by a computing device, cause the computing device to perform functions comprising:
obtaining a plurality of performance measures of an energy system as a function of time corresponding to a plurality of sets of values of input variables;
clustering the plurality of sets of values of the input variables and the performance measures associated therewith into groups;
defining a plurality of descriptors corresponding respectively to the groups; and
using the plurality of descriptors to predict a performance measure of the energy system by determining a group of the groups to which a particular set of values of the input variables under evaluation are assigned and using the performance measure as indicative of a performance of the energy system; and
controlling a parameter of the energy system in accordance with controllable parameters that are associated with the group,
wherein each set of the plurality of sets of values of the input variables comprises a time series of an input variable over a predetermined time frame, the functions further comprising determining the plurality of performance measures as a function of time over the predetermined time frame and aggregating the plurality of performance measures over the predetermined time frame,
wherein obtaining the plurality of performance measures comprises down-sampling the time series by partitioning an evolution of the input variable over the predetermined time frame into a plurality of discrete time segments,
wherein the down-sampling comprises performing an optimization process to determine the time segments of the discrete time segments having a non-uniform length, wherein the optimization process comprises an optimization of a cost function comprising a factor indicative of a goodness-of-fit of a down-sampled curve and a factor indicative of a goodness-of-fit of a statistical distribution of a down-sampled variable and a factor indicative of a smoothness of the variable or variables at its temporal resolution before down-sampling within each time segment.

18. The non-transitory computer readable medium of claim 17, wherein the clustering comprises, for each set of the plurality of sets of values of the input variables and the performance measures associated therewith, determining summary statistics for the plurality of sets of values and/or the performance measure and defining a point in a multidimensional space in which the clustering is performed, where this coordinate in the multidimensional space of the point comprises the summary statistics.

19. The non-transitory computer readable medium of claim 18, wherein the clustering comprises determining a similarity metric between points in the multidimensional space and determining the groups based on this similarity metric, the similarity metric comprising a hyper-distance measure in the multidimensional space.

20. The non-transitory computer readable medium of claim 18, wherein the clustering comprises an iterative clustering, wherein the groups are iteratively created and/or updated, and wherein in each clustering step, points in the multidimensional space that were not assigned to a group are flagged for re-evaluation in a further clustering step.

* * * * *